United States Patent
Onodera et al.

(10) Patent No.: US 11,111,349 B2
(45) Date of Patent: Sep. 7, 2021

(54) MOLDED FOAM

(71) Applicant: Kyoraku Co., Ltd., Kyoto (JP)

(72) Inventors: Masaaki Onodera, Yamato (JP); Takeru Sano, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 15/107,968

(22) PCT Filed: Dec. 8, 2014

(86) PCT No.: PCT/JP2014/082394
§ 371 (c)(1),
(2) Date: Jun. 24, 2016

(87) PCT Pub. No.: WO2015/098475
PCT Pub. Date: Jul. 2, 2015

(65) Prior Publication Data
US 2016/0333159 A1    Nov. 17, 2016

(30) Foreign Application Priority Data
Dec. 27, 2013    (JP) .............................. JP2013-272421

(51) Int. Cl.
| C08J 9/00 | (2006.01) |
| C08J 9/12 | (2006.01) |
| B29C 49/00 | (2006.01) |
| B29K 23/00 | (2006.01) |
| B29K 105/04 | (2006.01) |
| B29L 31/30 | (2006.01) |

(52) U.S. Cl.
CPC ......... *C08J 9/0061* (2013.01); *B29C 49/0005* (2013.01); *C08J 9/122* (2013.01); *B29K 2023/065* (2013.01); *B29K 2023/0633* (2013.01); *B29K 2105/04* (2013.01); *B29L 2031/30* (2013.01); *C08J 2201/03* (2013.01); *C08J 2203/06* (2013.01); *C08J 2203/08* (2013.01); *C08J 2205/052* (2013.01); *C08J 2207/00* (2013.01); *C08J 2323/06* (2013.01); *C08J 2423/06* (2013.01)

(58) Field of Classification Search
CPC ................. C08J 9/0061; C08J 9/122
See application file for complete search history.

(56) References Cited

U.S. PATENT DOCUMENTS

| 4,587,303 | A | 5/1986 | Turtle | |
| 6,372,809 | B1 | 4/2002 | Asai et al. | |
| 10,434,691 | B2 * | 10/2019 | Onodera | .................... C08J 9/06 |
| 2004/0166269 | A1 * | 8/2004 | Imanari | ............... B29C 49/0005 |
| | | | | 428/36.5 |
| 2010/0196641 | A1 * | 8/2010 | De Vos | .................. C08J 9/0061 |
| | | | | 428/36.5 |
| 2011/0047963 | A1 * | 3/2011 | Kasaoka | ............. F01N 13/1844 |
| | | | | 60/272 |
| 2011/0048571 | A1 * | 3/2011 | Onodera | ............... B29C 44/352 |
| | | | | 138/177 |
| 2011/0101558 | A1 * | 5/2011 | Onodera | ................. B29C 44/06 |
| | | | | 264/51 |
| 2011/0127688 | A1 * | 6/2011 | Onodera | ................ C08J 9/0061 |
| | | | | 264/54 |
| 2011/0305940 | A1 | 12/2011 | Usami et al. | |
| 2012/0060960 | A1 * | 3/2012 | Sumi | ....................... B29C 51/02 |
| | | | | 138/141 |
| 2013/0052377 | A1 * | 2/2013 | Tani | ........................ F16L 43/02 |
| | | | | 428/34.1 |
| 2013/0216747 | A1 | 8/2013 | Ishida | |
| 2015/0045468 | A1 | 2/2015 | Onodera | |

FOREIGN PATENT DOCUMENTS

| EP | 1172402 A1 | 1/2002 |
| EP | 1935621 A1 | 6/2008 |
| JP | 11140239 * | 5/1999 |
| JP | H11-140239 A | 5/1999 |
| JP | 2001124394 * | 5/2001 |
| JP | 2004-249680 A | 9/2004 |
| JP | 2005-241157 A | 9/2005 |
| JP | 4084209 B2 | 4/2008 |
| JP | 2011-052038 A | 3/2011 |
| JP | 2011-131776 A | 7/2011 |
| JP | 2011-194700 A | 10/2011 |
| JP | 2012-6198 A | 1/2012 |
| JP | 2012-107222 A | 6/2012 |
| JP | 2013-166896 A | 8/2013 |
| WO | 2013114996 A1 | 8/2013 |
| WO | WO2014057786 * | 4/2014 |

OTHER PUBLICATIONS

SABIC 2602X1 LDPE flyer, N/D.*
SABIC B5822 HDPE flyer, N/D.*
ExxonMobil LDPE LD 051.LQ flyer, date N/A.*
SABIC HDPE ICP49007S flyer, date N/A.*
ExxonMobil LDPE LD 117 flyer, date N/A.*
SABIC HDPE B5429, date N/A.*
European Search Report dated Jun. 30, 2017 during the prosecution of EP Patent Application No. 14874087.1.

(Continued)

*Primary Examiner* — Irina Krylova

(74) *Attorney, Agent, or Firm* — Maier & Maier, PLLC

(57) ABSTRACT

A molded foam that can be easily taken out of split mold blocks is provided. According to an aspect of the present disclosure, a molded foam is obtained by clamping, with split mold blocks, foamed resin obtained by melting and kneading a polyethylene-based resin, wherein the molded foam has a MFR (190° C., g/10 min) of less than 0.8, or the polyethylene-based resin has a MFR (190° C., g/10 min) of not more than 1.0.

6 Claims, 7 Drawing Sheets

(56) References Cited

OTHER PUBLICATIONS

International Search Report dated Mar. 10, 2015 issued in corresponding PCT International Application No. PCT/JP2014/082394.
Notice of Reasons for Rejection issued in corresponding Japanese Patent Application No. 2018-086182 dated Feb. 27, 2019.

* cited by examiner

Fig. 9

| Resin material | A(HD) | E(HD) | D(LD) | C(LD) | B(LD) | MFR of resin material calculated by blend ratio | MFR of molded instrument panel duct | Expansion ratio | Surface roughness | Ease of removal | Ease of deburring |
|---|---|---|---|---|---|---|---|---|---|---|---|
| MFR | 0.3 | 5.0 | 0.4 | 1.8 | 1.7 | | | | | | |
| Polymerization process | Tubular | Tubular | Tubular | Tubular | Autoclave | | | | | | |
| Example 1 | 50 | | | | 50 | 1.00 | 0.40 | 4.3 | Good | Good | Good |
| Example 2 | 60 | | | | 40 | 0.86 | 0.37 | 3.9 | Good | Good | Good |
| Example 3 | 70 | | | | 30 | 0.72 | 0.26 | 2.8 | Good | Good | Good |
| Example 4 | 80 | | | | 20 | 0.58 | 0.22 | 2.2 | Good | Good | Good |
| Example 5 | 90 | | | | 10 | 0.44 | 0.18 | 1.6 | Good | Good | Good |
| Example 6 | 60 | | | 40 | | 0.90 | 0.39 | 1.6 | Good | Good | Good |
| Example 7 | 60 | | 40 | | | 0.34 | 0.17 | 1.3 | Good | Good | Good |
| Example 8 | | | 100 | | | 0.40 | 0.18 | 1.6 | Good | Good | Good |
| Comparative example 1 | | | | | 100 | 1.70 | 0.80 | 5.0 | Good | Good | Poor |
| Comparative example 2 | | 60 | | | 40 | 3.68 | 3.20 | 4.3 | Poor | Poor | Poor |

MOLDED FOAM

CROSS-REFERENCE TO RELATED APPLICATIONS

This is a U.S. national phase application under 35 U.S.C. § 371 of International Patent Application No. PCT/JP2014/082394, filed on Dec. 8, 2014, and claims benefit of priority to Japanese Patent Application No. 2013-272421, filed Dec. 27, 2013. The entire contents of these applications are hereby incorporated by reference.

TECHNICAL FIELD

The present invention relates to a molded foam molded from foamed resin in molten state.

BACKGROUND ART

In air conditioning devices for automobiles, for example, tubular air-conditioning ducts are used for ventilating air.

An air-conditioning duct using a molded foam is known. The molded foam includes foamed resin obtained by foaming thermoplastic resin using a foaming agent. The molded foam makes it possible to achieve both high thermal insulating property and light weight. Accordingly, there is a growing demand for molded foams.

As a method for manufacturing a molded foam, blow molding method is widely known which includes blowing air into molten foamed resin being clamped by split mold blocks, and expanding the resin.

In an example of technical literature of an application filed prior to the present invention, Japanese Unexamined Patent Application Publication No. 2005-241157A discloses a foamed duct molded by foamed blow molding which includes adding supercritical fluid as a foaming agent, wherein the foamed duct has an outer surface roughness and expansion ratio within predetermined ranges.

Japanese Patent No. 4084209B2 discloses a technology for forming a foamed layer by foaming a foamed layer base material resin using a physical foaming agent. As the foamed layer base material resin, a resin obtained by compounding a specific high-density polyethylene and a specific low-density polyethylene at a specific ratio is used.

SUMMARY OF THE INVENTION

In Japanese Unexamined Patent Application Publication No. 2005-241157A, an example is disclosed in which polypropylene-based resin is used as raw material resin for the foamed duct. As the raw material resin for a molded foam, polypropylene-based resin is commonly used, as described in Japanese Unexamined Patent Application Publication No. 2005-241157A. The polypropylene-based resin, however, has high raw material cost. Accordingly, in recent years, polyethylene-based resin has been used in some cases as the raw material resin for molded foam, as described in Japanese Patent No. 4084209B2. The polyethylene-based resin raw material is typically less expensive than the polypropylene-based resin raw material. Thus, the polyethylene-based resin raw material enables manufacture of a molded foam at reduced cost.

The present inventors have attempted to obtain a desired molded foam by using polyethylene-based resin as molded foam raw material resin.

It turned out, however, that, depending on the polyethylene-based resin used as the molded foam raw material resin, the resin constituting the molded foam sometimes becomes attached to split mold blocks when the molded foam that has been molded while being clamped by the split mold blocks is taken out of the split mold blocks. As a result, the molded foam cannot be easily removed from the split mold blocks. Accordingly, there is a need for taking out the molded foam from the split mold blocks easily.

An object of the present disclosure is to provide a molded foam that can be easily taken out of split mold blocks.

According to an aspect of the present disclosure, there is provided a molded foam molded by clamping, by split mold blocks, a foamed resin obtained by melting and kneading a polyethylene-based resin. The molded foam has a MFR (190° C., g/10 min) of less than 0.8, or the polyethylene-based resin has a MFR (190° C., g/10 min) of not more than 1.0.

According to the present invention, a molded foam that can be easily taken out of the split mold blocks can be obtained.

BRIEF DESCRIPTION OF THE DRAWINGS

FIG. 9 is a chart of examples and comparative examples.

DETAILED DESCRIPTION OF THE INVENTION

Outline of Molded Foam 1 According to an Aspect of the Present Disclosure

Figure 1:
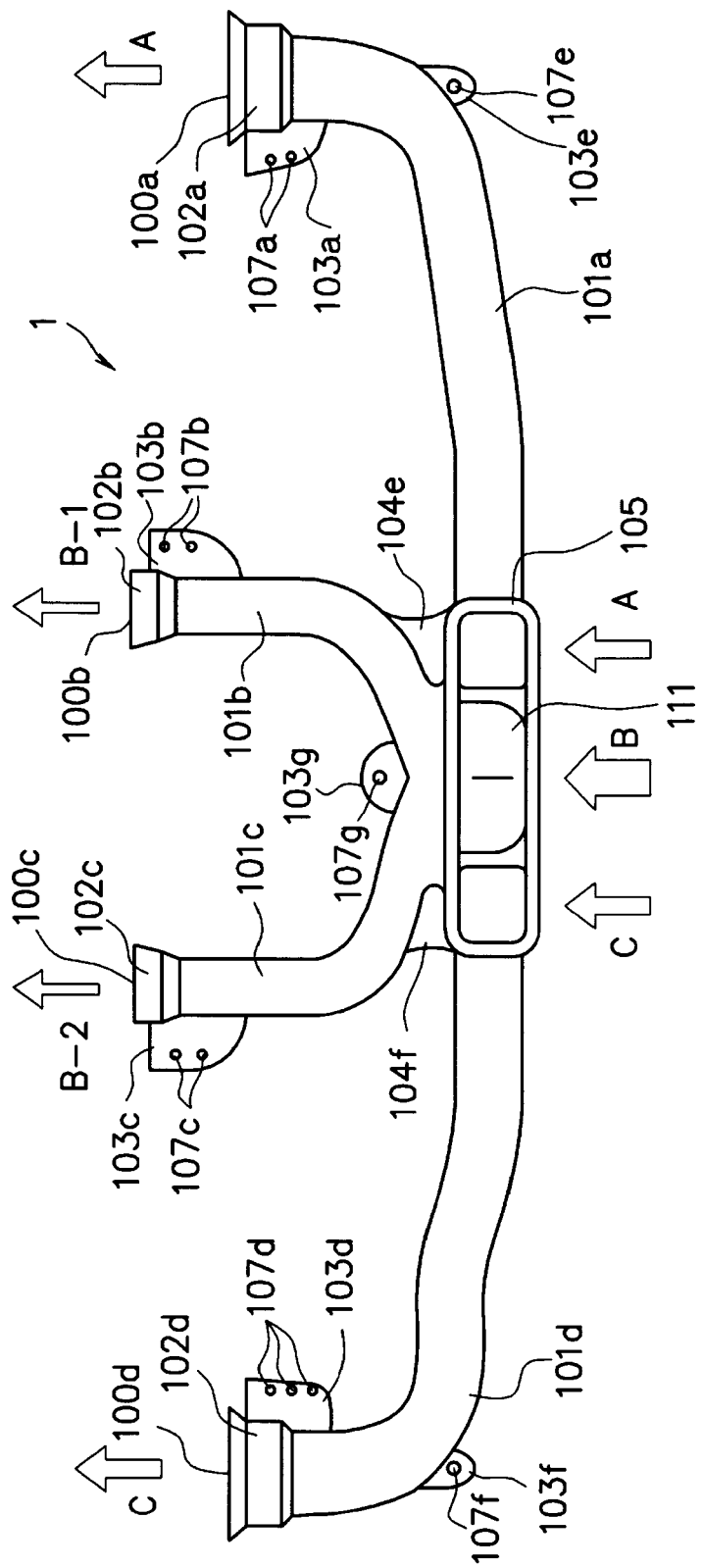
FIG. 1 is a plan view of an instrument panel duct 1 according to an example.

With reference to FIG. 1 and FIG. 9, the outline of an example of a molded foam 1 according to an aspect of the present disclosure will be described. FIG. 1 depicts a configuration example of the molded foam 1 according to an aspect of the present disclosure. FIG. 9 is a chart for describing the molded foam 1 according to an aspect of the present disclosure.

The molded foam 1 according to an aspect of the present disclosure is molded by clamping foamed resin with split mold blocks. The foamed resin is obtained by melting and kneading polyethylene-based resin. The molded foam 1 according to an aspect of the present disclosure is characterized in that, as indicated in FIG. 9, the molded foam 1 obtained by molding has a melt flow rate (MFR; 190° C., g/10 min) of less than 0.8, or the polyethylene-based resin has a MFR (190° C., g/10 min) of not more than 1.0.

When the MFR of the molded foam 1 obtained by molding is set to be less than 0.8, or when the MFR of the polyethylene-based resin is set to be not more than 1.0, the foamed resin constituting the molded foam 1 can be prevented from becoming attached to the split mold blocks when the molded foam 1 is removed from between the split mold blocks. Accordingly, the molded foam 1 can be easily taken out of the split mold blocks. In the following, an example of the molded foam 1 according to an aspect of the present disclosure will be described in detail with reference to the attached drawings. In the following description of the example, an instrument panel duct 1 will be described as an example of the molded foam 1.

<Configuration Example of Instrument Panel Duct 1>

Figure 2:
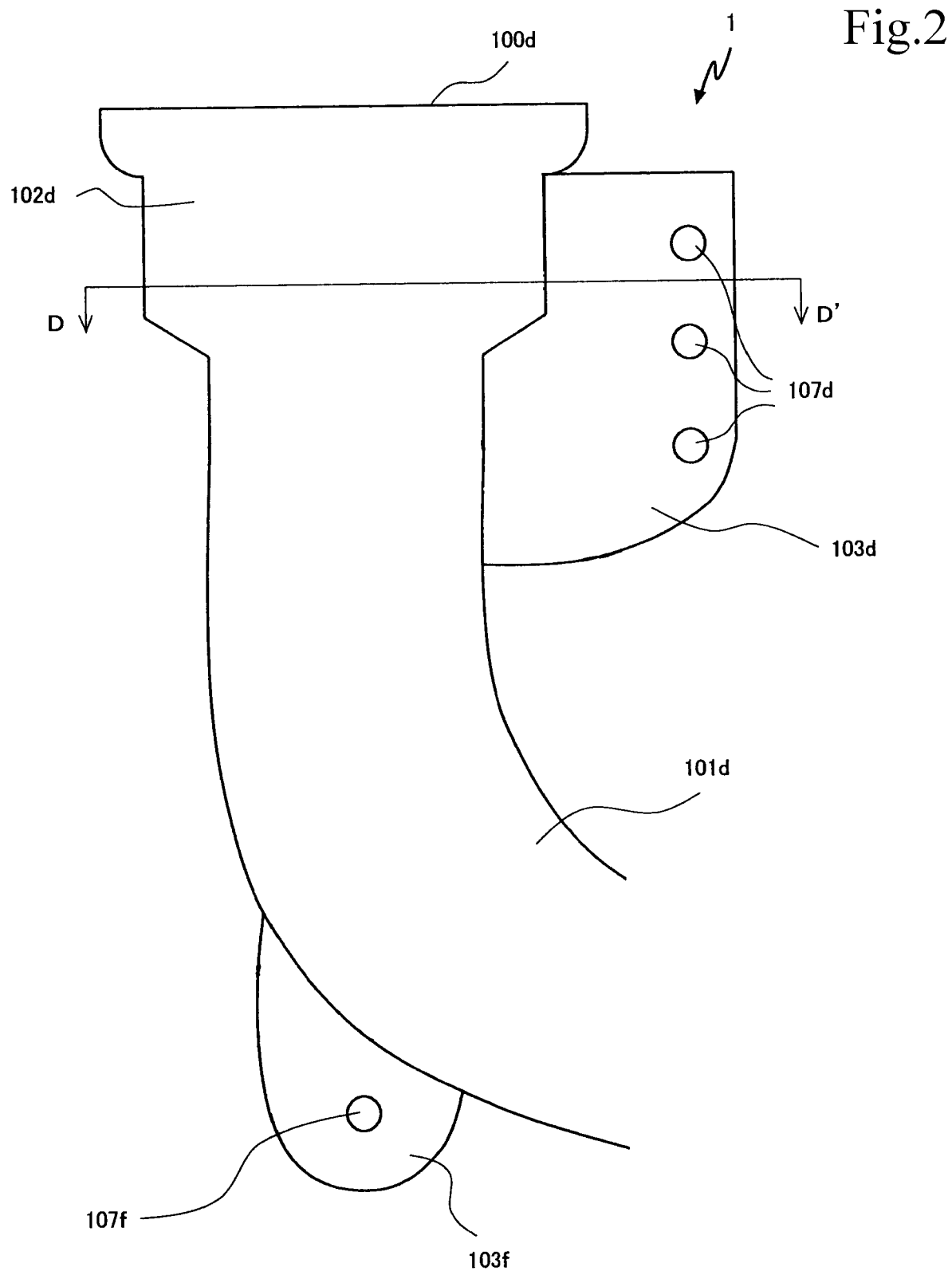
FIG. 2 depicts a part of the instrument panel duct 1 around a fitting portion 102d thereof.
Figure 3:
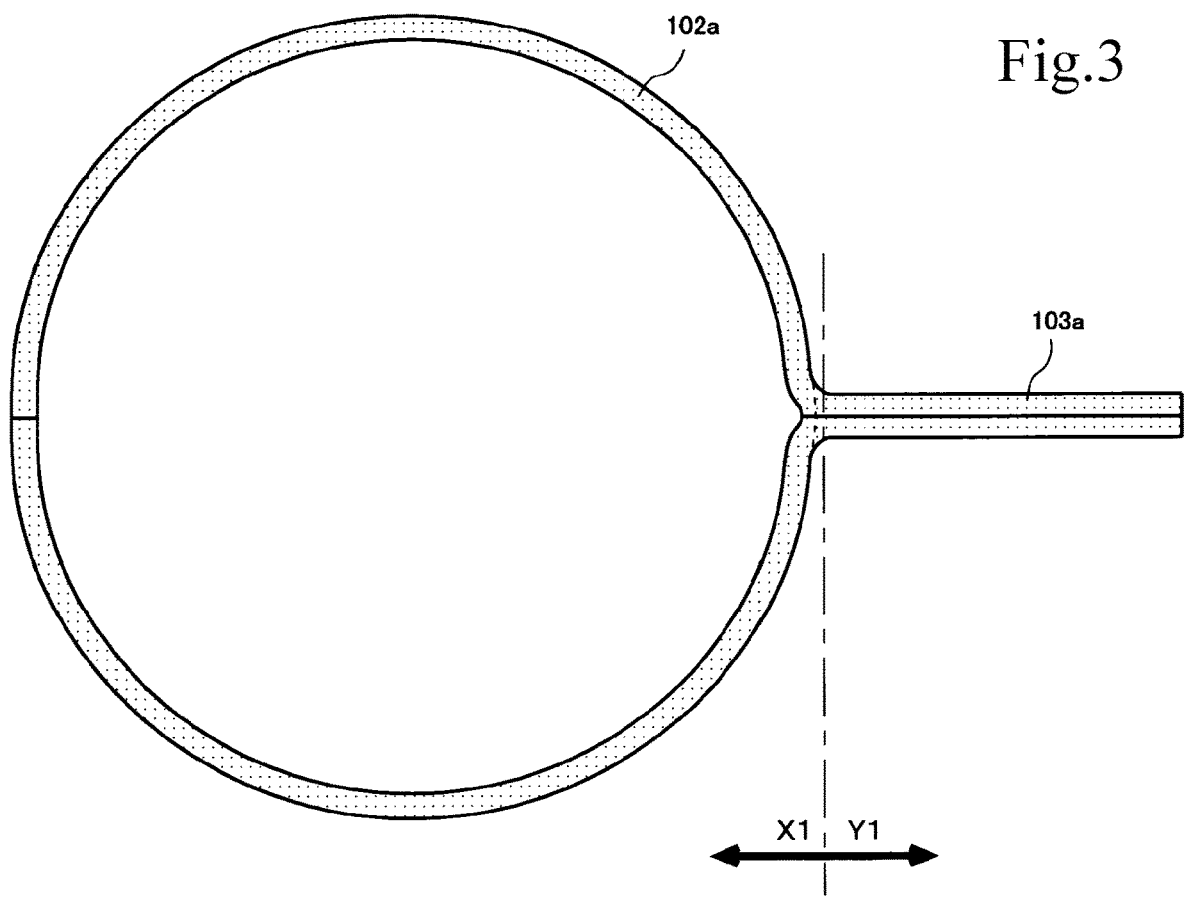
FIG. 3 is a cross sectional view taken along D-D' of FIG. 2.

With reference to FIG. 1 to FIG. 3, a configuration example of the instrument panel duct 1 according to the present example will be described. FIG. 1 is a schematic plan view of the instrument panel duct 1. In FIG. 1, there is illustrated the side of the instrument panel duct 1 on which a supply portion 105 for connecting an air conditioner unit (not illustrated) is provided. FIG. 2 is a schematic plan view of a part around a fitting portion 102d illustrated in FIG. 1. FIG. 3 is a cross sectional view taken along D-D' of FIG. 2.

The instrument panel duct 1 according to the present example is a lightweight instrument panel duct for allowing cool or warm air supplied from the air conditioner unit to be circulated to desired locations.

The instrument panel duct 1 according to the present example is molded by blow-molding foamed resin clamped by split mold blocks. The foamed resin is obtained by melting and kneading predetermined polyethylene-based resin.

The instrument panel duct 1 according to the present example has an expansion ratio of 1.3 or more. The instrument panel duct 1 has a closed cell structure with a plurality of cells (having a closed cell content of 70% or more). The instrument panel duct 1 has an average thickness of 0.5 mm or more. The instrument panel duct 1 has a duct inner surface with a surface roughness Rmax of 200 μm or less. When the surface roughness Rmax is 200 μm or less, an increase in ventilation efficiency can be achieved. Preferably, the instrument panel duct 1 according to the present example has a tensile fracture elongation at −10° C. of 40% or more, and a tensile elastic modulus at normal temperature of 1000 kg/cm$^2$ or more. Preferably, the tensile fracture elongation at −10° C. may be 100% or more. The terms used in the present example are defined in the following.

Expansion ratio: The expansion ratio is defined as a value obtained by dividing the density of foamed resin used for a molding method of the present example that will be described later, by the apparent density of a tube body X1 (see FIG. 3) of the instrument panel duct 1 obtained by the molding method of the present example.

Tensile fracture elongation: A part of the tube body X1 of the instrument panel duct 1 obtained by the molding method of the present example as will be described below is cut out. The cut-out part is stored at −10° C., and, using the part as a No. 2 test specimen in accordance with JIS K-7113, the tension speed is measured at 50 mm/min. The resultant value is defined as the tensile fracture elongation.

Tensile elastic modulus: A part of the tube body X1 of the instrument panel duct 1 obtained by the molding method of the present example as will be described below is cut out. Using the part as a No. 2 test specimen at normal temperature (for example, 23° C.) in accordance with JIS K-7113, the tension speed is measured at 50 mm/min. The resultant value is defined as the tensile elastic modulus.

As illustrated in FIG. 1, one end of tube portions 101 (101a to 101d) of the instrument panel duct 1 according to the present example is provided with a supply portion 105 to be connected to an air conditioner unit (not illustrated). The other end of the tube portions 101 (101a to 101d) is provided with a fitting portions 102 (102a to 102d). The tube portions 101 (101a to 101d), the supply portion 105, and the fitting portions 102 (102a to 102d) constitute a tube body X1 (see FIG. 3) to which flange portions 103 (103a to 103g) are connected.

In the present example, an "average thickness" refers to the average of thickness values of the molded article measured at equal intervals of approximately 100 mm along a hollow extension direction of the molded article. For example, the thickness is measured of two wall portions of a hollow molded article that are welded via a parting line, each at a position along a direction perpendicular to the parting line, and an average value of the measured thicknesses provides the average thickness. The measurement positions are selected so as not to include the flange portions 103 and the like.

The inside of the tube body X1 is configured with a flow passageway for circulating fluid so as to allow cool or warm air from the air conditioner unit to be circulated therethrough.

The flow passageway for the fluid supplied from an opening portion 111 of the supply portion 105 into the tube body X1 is divided into four flow passageways A, B-1, B-2, and C, as illustrated in FIG. 1. The fluid supplied via the opening portion 111 of the supply portion 105 into the tube body X1 flows out of the opening portion of the fitting portion 102a via the flow passageway A. The fluid also flows out of the opening portion of the fitting portion 102b via the flow passageway B-1. The fluid also flows out of the opening portion of the fitting portion 102c via the flow passageway B-2. In addition, the fluid flows out of the opening portion of the fitting portion 102d via the flow passageway C.

The configuration of the instrument panel duct 1 around the flow passageway A includes the supply portion 105 provided at one end of the tube portion 101a, with the fitting portion 102a provided at the other end thereof. To the tube body X1 configured with the tube portion 101a, the supply portion 105, and the fitting portion 102a, the flange portions 103a and 103e are connected. The flange portion 103a is provided with an affixing hole 107a for affixing the instrument panel duct 1 to another tubular member connected by the fitting portion 102a. By inserting a bolt, which is not illustrated, through the affixing hole 107a and fastening the bolt with a nut, the instrument panel duct 1 can be affixed with respect to the other tubular member. The flange portion 103e is also provided with an affixing hole 107e.

The configuration of the instrument panel duct 1 around the flow passageway B-1 includes the supply portion 105 provided at one end of the tube portion 101b, with the fitting portion 102b provided at the other end thereof. To the tube body X1 configured with the tube portion 101b, the supply portion 105, and the fitting portion 102b, the flange portion 103b is connected. The flange portion 103b is provided with an affixing hole 107b for affixing the instrument panel duct 1 to another tubular member connected by the fitting portion 102b.

At a narrow interval portion between the tube portions 101a and 101b, a bridge portion 104e for maintaining strength is provided and connected with the tube portions 101a and 101b.

The configuration of the instrument panel duct 1 around the flow passageway B-2 is similar to the configuration around the flow passageway B-1 described above.

The configuration of the instrument panel duct 1 around the flow passageway C is similar to the configuration around the flow passageway A described above.

Between the tube portions 101b and 101c, the flange portion 103g is provided and connected with the tube portions 101b and 101c. The flange portion 103g is also provided with an affixing hole 107g.

As illustrated in FIG. 1, the instrument panel duct 1 according to the present example has the tube body X1 (see FIG. 3) with the flange portions 103 (103a to 103g) connected to the outside thereof. The tube body X1 refers to the portion including the tube portions 101 (101a to 101d), the supply portion 105, and the fitting portions 102 (102a to 102d).

In the instrument panel duct 1 according to the present example, the opening portions 100 of the fitting portions 102 have an opening area greater than the opening area of the tube portions 101. The opening area of the tube portions 101 refers to the area of an opening portion of the tube portions 101 in a section taken along a direction perpendicular to the direction in which the flow passageway of the instrument panel duct 1 extends. The opening area of the opening portions 100 of the fitting portions 102 can be made greater than the opening area of the tube portions 101 by, for example, configuring the fitting portions 102 in bell shape. The bell shape refers to a shape with increasingly greater opening area toward the opening end.

<Exemplary Molding Method for Instrument Panel Duct 1>

Figure 4:
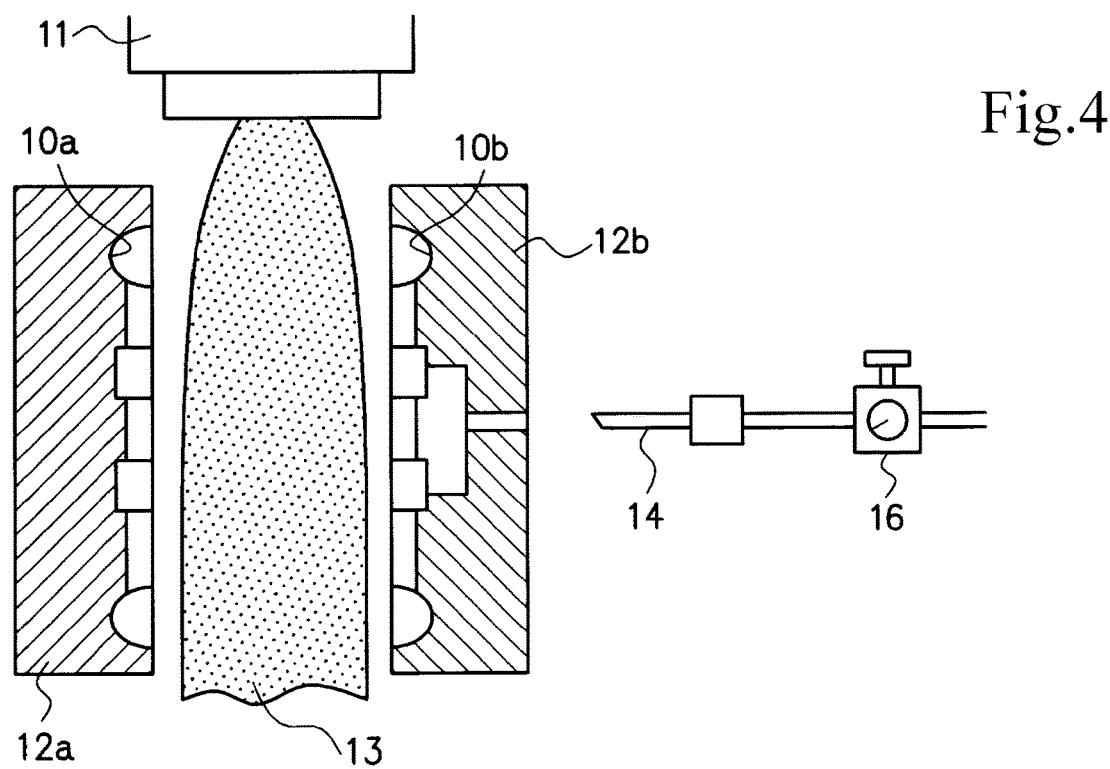
FIG. 4 is a first diagram illustrating an exemplary molding method for the instrument panel duct 1 according to the present example.
Figure 5:
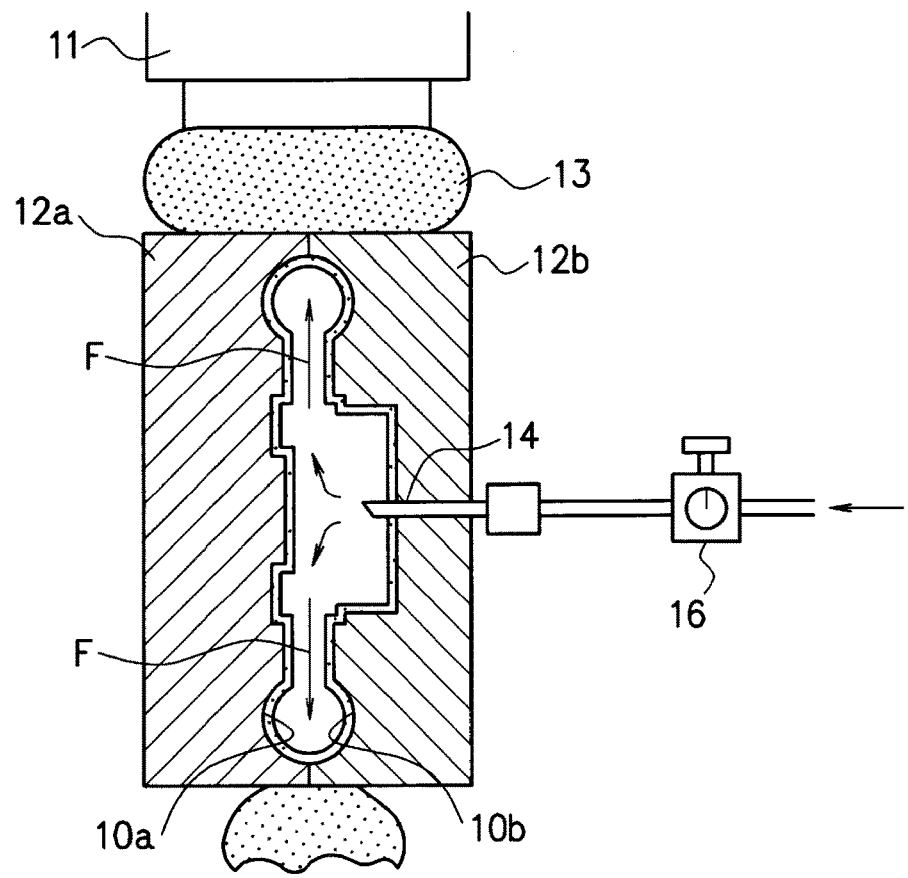
FIG. 5 is a second diagram illustrating the exemplary molding method for the instrument panel duct 1 according to the present example.
Figure 6:
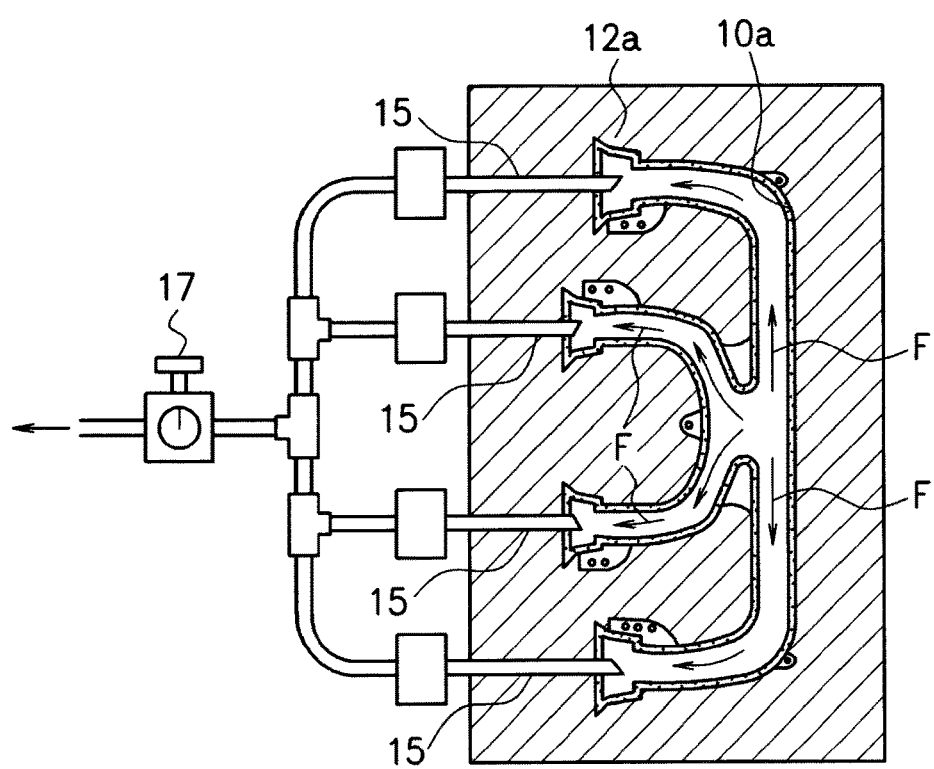
FIG. 6 is a third diagram illustrating the exemplary molding method for the instrument panel duct 1 according to the present example.

With reference to FIG. 4 to FIG. 6, an exemplary molding method for the instrument panel duct 1 according to the present example will be described. FIG. 4 is a side view of split mold blocks in open state. FIG. 5 is a side view of the split mold blocks in closed state. FIG. 6 is a cross sectional view of the two split mold blocks in closed state taken along a contact surface thereof as viewed from a split mold block 12a side.

As illustrated in FIG. 4, a cylindrical foamed parison 13 obtained by injecting foamed parison from an annular die 11 is extruded between the split mold blocks 12a and 12b.

The split mold blocks 12a and 12b are then clamped, whereby, as illustrated in FIG. 5, the foamed parison 13 is sandwiched between the split mold blocks 12a and 12b. In this way, the foamed parison 13 is stored in cavities 10a and 10b of the split mold blocks 12a and 12b.

Then, as illustrated in FIG. 5 and FIG. 6, with the split mold blocks 12a and 12b clamped, a blow-in needle 14 and blow-out needles 15 are simultaneously pierced into the foamed parison 13, thereby piercing predetermined holes provided in the split mold blocks 12a and 12b. As the tips of the blow-in needle 14 and blow-out needles 15 enter the foamed parison 13, compressed gas, such as compressed air, is immediately blown into the foamed parison 13 via the blow-in needle 14. The compressed gas passes through the foamed parison 13 and is blown out via the blow-out needles 15. In this way, blow molding is performed at predetermined blow pressure.

The blow-in needle 14 pierces the position corresponding to the opening portion 111 of the supply portion 105 of the instrument panel duct 1 illustrated in FIG. 1. Thus, a blow-in opening for blowing the compressed gas into the foamed parison 13 is formed. The blow-out needles 15 pierce the positions corresponding to the opening portions 100 (100a to 100d) of the fitting portions 102 (102a to 102d) of the instrument panel duct 1 illustrated in FIG. 1. Thus, blow-out openings for blowing out the compressed gas from inside the foamed parison 13 to the outside are formed.

Accordingly, the compressed gas can be blown into the foamed parison 13 via the blow-in needle 14. The compressed gas passes through the foamed parison 13 and is blown out of the blow-out needles 15. In this way, blow molding can be performed at predetermined blow pressure.

According to the present example, the compressed gas is blown into the foamed parison 13 from the blow-in needle 14, and discharged out of the cavities 10a and 10b of the split mold blocks 12a and 12b. This produces a negative pressure state in the gap between the foamed parison 13 and the cavities 10a and 10b. As a result, a pressure difference is set (i.e., the pressure inside the foamed parison 13 becomes higher than the external pressure) between the inside and outside of the foamed parison 13 stored in the cavities 10a and 10b in the split mold blocks 12a and 12b. Accordingly, the foamed parison 13 is pressed onto wall surfaces of the cavities 10a and 10b.

In the above-described molding step, the step of blowing the compressed gas into the foamed parison 13 and the step of producing a negative pressure outside the foamed parison 13 may not be performed simultaneously, and may be performed at different times.

Figure 7:
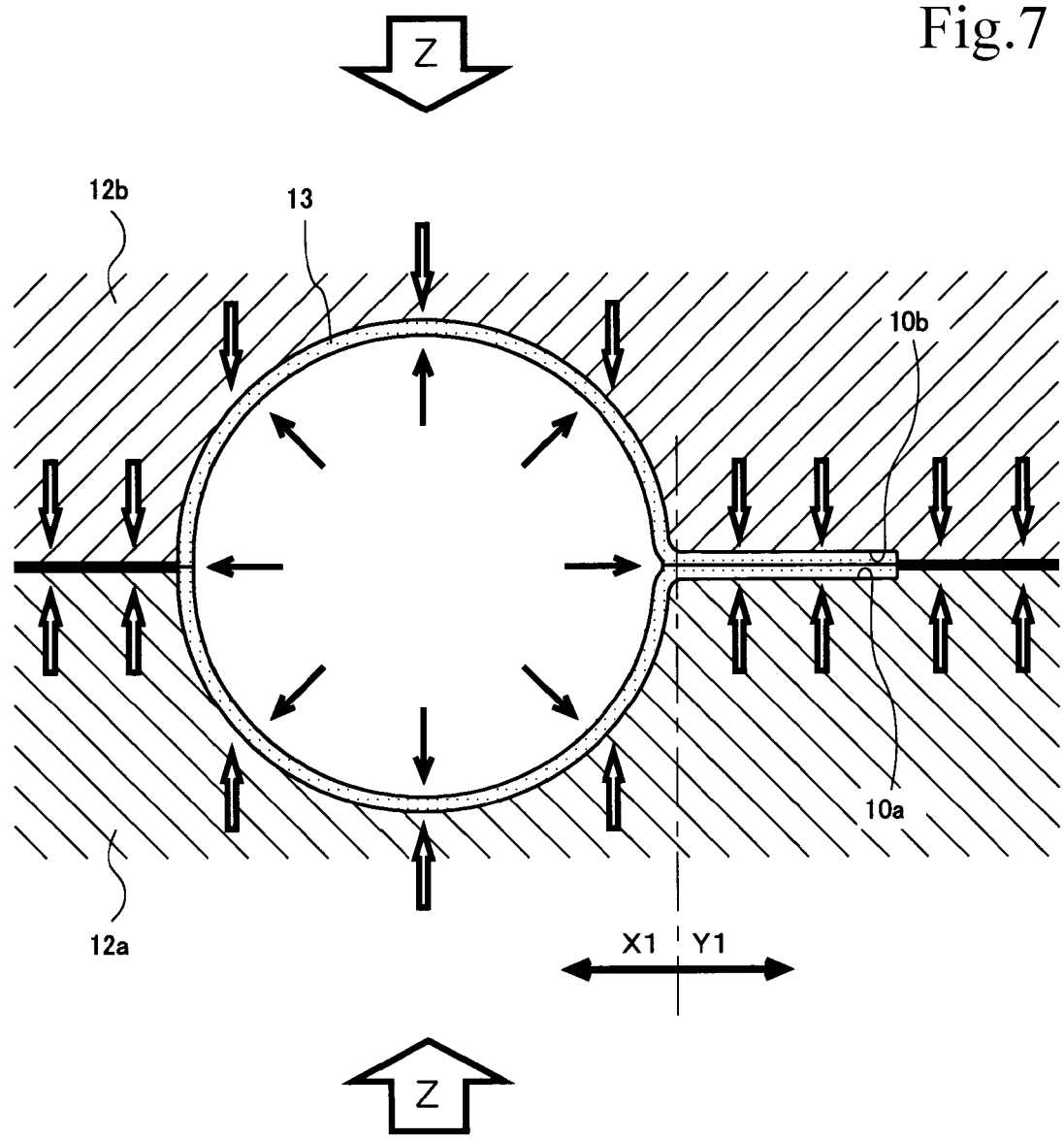
FIG. 7 depicts parts around the fitting portion 102d being clamped by split mold blocks.

According to the present example, as illustrated in FIG. 7, the foamed parison 13 is clamped by the split mold blocks 12a and 12b with pressing force Z. Accordingly, as described above, the portion of the foamed parison 13 corresponding to the tube body X1 is pressed onto the cavities 10a and 10b at predetermined blow pressure. At the same time, the portions corresponding to the board-like portion Y1 of the flange portions 103 (103a to 103g) and the bridge portions 104 (104e and 104f) are pressed in the thickness direction and compressed to the thickness between the cavities 10a and 10b of the split mold blocks 12a and 12b.

For the portion of the foamed parison 13 corresponding to the tube body X1, compressed gas, such as compressed air, is blown from the blow-in needle 14 into the foamed parison 13 as described above. The compressed gas passes through the foamed parison 13 and is blown out of the blow-out needles 15. Then, the foamed parison 13 is pressed onto the cavities 10a and 10b by predetermined blow pressure for a predetermined time, and 50% to 80% of the foamed parison 13 from the side of the cavities 10a and 10b in the thickness direction of the tube body X1 is cooled and solidified. Thereafter, the remaining foamed parison 13 in molten state is allowed to naturally solidify while being clamped by the split mold blocks 12a and 12b without performing cooling with compressed gas.

The temperature of the compressed gas supplied from the blow-in needle 14 into the foamed parison 13 for cooling is set to 10° C. to 30° C. and preferably room temperature (for example, 23° C.). By setting the compressed gas temperature to room temperature, the need for providing a temperature adjustment facility for adjusting the compressed gas temperature can be eliminated. Consequently, the instrument panel duct 1 can be molded at lower cost. On the other hand, a temperature adjustment facility may be provided to lower the temperature of the compressed gas supplied from the blow-in needle 14 into the foamed parison 13 below room temperature, whereby the time for cooling the instrument panel duct 1 can be reduced. The time (i.e., duration of application) for cooling by compressed gas may preferably be not more than 35 seconds, depending on the compressed gas temperature. In this way, approximately 50% to 80% of the foamed parison 13 from the side of the cavities 10a and 10b in the thickness direction of the tube body X1 can be cooled and solidified while the foamed parison 13 is maintained in molten state on the inner surface side of the tube body X1. Thereafter, the remaining foamed parison 13 in molten state can be allowed to naturally solidify while being clamped by the split mold blocks 12a and 12b without performing cooling by compressed gas.

The resin that may be used for molding the instrument panel duct 1 according to the present example is preferably foamed resin obtained by melting and kneading predetermined polyethylene-based resin so that the MFR of the instrument panel duct 1 as a molded article becomes less than 0.8. When the MFR of the instrument panel duct 1 as a molded article is 0.8 or more, it may become impossible to obtain the instrument panel duct 1 having high surface roughness, ease of removal, and ease of deburring. In order to measure the MFR value, resin is obtained by heating and melting and thereby defoaming a sample piece cut out of the molded article, and the resin is measured at a test temperature of 190° C. and with test load of 2.16 kg according to JIS K-7210. The surface roughness, ease of removal, and ease of deburring will be described with reference to examples that will be described below.

The polyethylene-based resin forming the foamed resin is formed by melting and kneading a polyethylene-based elemental resin, a high-density polyethylene-based elemental resin, a blend resin obtained by mixing a plurality of low-density polyethylene-based resins, a blend resin obtained by mixing a plurality of high-density polyethylene-based resins, and a blend resin obtained by mixing a low-density polyethylene-based resin and a high-density polyethylene-based resin. In this case, the MFR (190° C., g/10 min) of the polyethylene-based resin for forming the foamed resin is not more than 1.0.

For example, when the foamed resin is formed using two polyethylene-based resins, the MFRs of the two polyethylene-based resins are set such that the MFR obtained by a calculation process performed on the mixture ratios of the two polyethylene-based resins satisfies the following Expression 1:

$$A \times X/100 + B \times Y/100 \leq 1.0 \qquad \text{Expression 1}$$

where

A is the MFR of the first polyethylene-based resin;

B is the MFR of the second polyethylene-based resin;

X is the mixture ratio of the first polyethylene-based resin forming the foamed resin;

Y is the mixture ratio of the second polyethylene-based resin forming the foamed resin; and

X+Y=100.

It may be more preferable to form the foamed resin using polyethylene-based resin manufactured by autoclave process than using polyethylene-based resin manufactured by tubular process. This is because the expansion ratio of the instrument panel duct 1 as a molded article can be made higher by using the polyethylene-based resin manufactured by autoclave process than by using the polyethylene-based resin manufactured by tubular process. The MFR of the low-density polyethylene-based resin is preferably 1.0 to 3.0.

The foamed resin used for molding the instrument panel duct 1 may also be formed using pulverized material obtained by pulverizing the burr produced during the molding of the instrument panel duct 1. In this case, rather than forming the foamed resin solely with 100% pulverized material, it may be more preferable to form the foamed resin by melting and kneading the pulverized material and virgin material. The virgin material refers to unused resin. As such resin, according to the present example, the above-described polyethylene-based resin is used. By using virgin material, degradation of the resin constituting the instrument panel duct 1 can be avoided. When pulverized material and virgin material are melted and kneaded to form foamed resin, the ratio of the pulverized material to virgin material that are melted and kneaded may be 90% to 10%.

Examples of the foaming agent that may be applied when molding the instrument panel duct 1 according to the present example include physical foaming agents, chemical foaming agents, and mixtures thereof. Examples of the physical foaming agents include inorganic physical foaming agents such as air, carbonic acid gas, nitrogen gas, and water; organic physical foaming agents such as butane, pentane, hexane, dichloromethane, and dichloroethane; and supercritical fluids thereof. Preferably, the instrument panel duct may be fabricated using carbon dioxide, nitrogen, or the like as supercritical fluid. When nitrogen is used, the instrument panel duct may be fabricated by setting the critical temperature at −149.1° C. or above, and the critical pressure at 3.4 MPa or above. When carbon dioxide is used, the instrument panel duct may be fabricated by setting the critical temperature at 31° C. or above and the critical pressure at 7.4 MPa or above.

After the molding, the instrument panel duct 1 is taken out of the split mold blocks 12a and 12b. Specifically, the split mold blocks 12a and 12b are opened with the burrs formed on top of the instrument panel duct 1 being gripped by a predetermined machine (such as clips). The instrument panel duct 1 is then removed from between the split mold blocks 12a and 12b.

Then, unwanted portions, such as burrs, formed around the instrument panel duct 1 taken out of the split mold blocks 12a and 12b are removed. In this way, the instrument panel duct 1 having a complex shape as illustrated in FIG. 1 can be obtained.

As illustrated in FIG. 1, in the vicinity of all of the opening portions 100 (100a to 100d) and 111 formed on the fitting portions 102 (102a to 102d) and the supply portion 105 constituting the tube body X1 of the instrument panel duct 1 according to the present example, there are provided the flange portions 103 (103a to 103g) and the bridge portions 104 (104e, 104f). Accordingly, the instrument panel duct 1 according to the present example can be affixed to other tubular members at around the opening portions 100 and 111. In addition, the strength around the opening portions 100 and 111 can be increased. Nevertheless, the outer shape of the instrument panel duct 1 according to the present example as a whole may become complex. As a result, it may be difficult to take out the instrument panel duct 1 from the split mold blocks 12a and 12b.

(Other Exemplary Molding Methods)

The instrument panel duct 1 according to the foregoing example may be molded by a molding method which will be described below with reference to FIG. 8.

Figure 8:
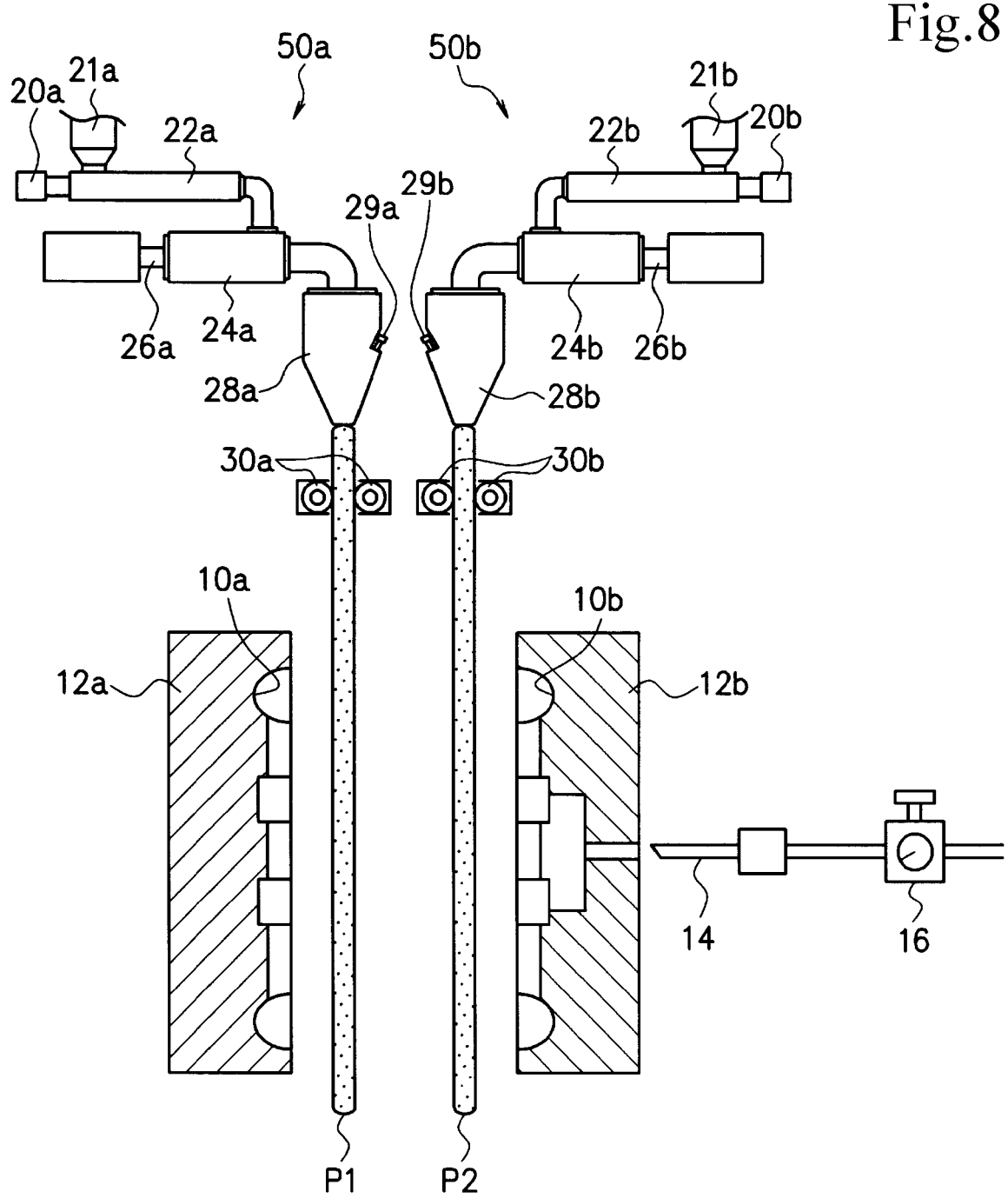
FIG. 8 is a diagram illustrating another exemplary molding method.

According to the molding method of FIG. 8, instead of the cylindrical foamed parison 13 being extruded between the split mold blocks 12a and 12b for molding by the above-described molding method, sheets of foamed resin are extruded between the split mold blocks 12a and 12b for molding.

As illustrated in FIG. 8, the molding device used by the other molding method includes two extruding machines 50a and 50b as well as the split mold blocks 12a and 12b similar to those used by the preceding exemplary molding method.

The extruding machines 50 (50a and 50b) are disposed such that resin sheets P1 and P2 of foamed resin in molten state, including the same material as that of the foamed parison 13 used by the earlier exemplary molding method, can droop substantially in parallel with a predetermined interval between the split mold blocks 12a and 12b. Under T-dies 28a and 28b for extruding the resin sheets P1 and P2, adjust rollers 30a and 30b are disposed. The adjust rollers 30a and 30b are used to adjust the thickness of the sheets, for example. The thus extruded resin sheets P1 and P2 are sandwiched and clamped between the split mold blocks 12a and 12b, whereby an instrument panel duct is molded.

The two extruding machines 50 (50a and 50b) have the same configuration. Thus, one of the extruding machines 50 will be described with reference to FIG. 8.

The extruding machine 50 includes a cylinder 22 fitted with a hopper 21; a screw (not illustrated) disposed in the cylinder 22; a hydraulic motor 20 coupled with the screw; an accumulator 24 internally in communication with the cylinder 22; a plunger 26 disposed in the accumulator 24; the T-die 28; and a pair of adjust rollers 30.

Resin pellets are fed from the hopper 21 into the cylinder 22, where the pellets are melted and kneaded by the screw rotated by the hydraulic motor 20. Then, foamed resin in molten state is transported to the accumulator 24. In the accumulator 24, a certain quantity of foamed resin is accumulated. As the plunger 26 is driven, the foamed resin feeds out toward the T-die 28. Via an extrusion slit at the lower end of the T-die 28, a continuous sheet of the foamed resin in molten state is extruded. The resin sheet is sent downward while being compressed between the adjust rollers 30 disposed at an interval. The resin sheet then droops between the split mold blocks 12a and 12b.

The T-die 28 is fitted with a die bolt 29 for adjusting the slit interval of the extrusion slit. In addition to the die bolt 29, which is a mechanical unit, other slit interval adjusting mechanisms using various known adjustment mechanisms may be employed.

By the above configuration, the resin sheets P1 and P2 having internal foamed cells are extruded from the extrusion slits of the two T-dies 28a and 28b. The sheets are adjusted to have a uniform thickness in the vertical direction (i.e., the direction of extrusion). The sheets then droop between the split mold blocks 12a and 12b.

When the resin sheets P1 and P2 are thus disposed between the split mold blocks 12a and 12b, the split mold blocks 12a and 12b are advanced horizontally until molds, not illustrated but positioned on the outer periphery of the split mold blocks 12a and 12b, are closely attached to the resin sheets P1 and P2. After the resin sheets P1 and P2 are held by the molds on the outer periphery of the split mold blocks 12a and 12b, the resin sheets P1 and P2 are suctioned by vacuum into the cavities 10a and 10b of the split mold blocks 12a and 12b, whereby the resin sheets P1 and P2 each are given shapes conforming to the cavities 10a and 10b.

The split mold blocks 12a and 12b are then horizontally advanced and clamped and, as in the case of the molding method described earlier, the blow-in needle 14 and the blow-out needles 15 are pierced into the resin sheets P1 and P2. From the blow-in needle 14, compressed gas, such as compressed air, is blown into the resin sheets P1 and P2. The compressed gas passes through the resin sheets P1 and P2 and is blown out of the blow-out needles 15. In this way, the inside of the portion corresponding to the tube body X1 of the instrument panel duct 1 is cooled.

Thereafter, the split mold blocks 12a and 12b are withdrawn horizontally and removed from the instrument panel duct 1.

The resin sheets P1 and P2 drooping between the pair of split mold blocks 12a and 12b may have thickness variations due to drawdown or neck-in, for example. Accordingly, in order to prevent this, it may be necessary to adjust the thickness of the resin sheet, extrusion speed, thickness distribution in the extrusion direction, and the like individually.

For such adjustments of the resin sheet thickness, extrusion speed, thickness in the extrusion direction and the like, various known methods may be used.

Thus, the instrument panel duct 1 according to the present example can also be molded in a preferable manner by the other exemplary molding method described with reference to FIG. 8, in the same way as according to the molding method described with reference to FIG. 4 to FIG. 6. By the other exemplary molding method of FIG. 8, the instrument panel duct 1 adapted to various conditions can be molded by setting mutually different materials, expansion ratios, thicknesses and the like for the two resin sheets P1 and P2.

EXAMPLES

The instrument panel duct 1 will be described with reference to examples and comparative examples. It should be noted, however, that the present example is not limited to the following examples.

Example 1

Foamed resin as raw material resin for the instrument panel duct 1 was prepared by melting and kneading 50 parts by mass of resin A and 50 parts by mass of resin B. A foamed blow molding machine equipped with a screw-type extruder having a gas supply opening in a cylinder thereof was used. Via the gas supply opening, supercritical fluid of nitrogen was added. A sample of the instrument panel duct 1 having the same shape as the instrument panel duct 1 illustrated in FIG. 1 was molded by the same molding method as described with reference to FIG. 4 to FIG. 6; namely, by foamed blow molding, under the following molding conditions.

Resin A was a high-density polyethylene-based resin (B470 manufactured by Asahi Kasei Chemicals Corp.; density=0.949 g/cm$^3$, MFR=0.3 g/10 min at 190° C., polymerization process=tubular process).

Resin B was a low-density polyethylene-based resin (Sumikathene G201F manufactured by Sumitomo Chemical Co., Ltd.; density=0.919 g/cm$^3$, MFR=1.7 g/10 min, 190° C., polymerization process=autoclave process).

The MFR (190° C., g/10 min) of the resin material calculated according to the blend ratio of 50 parts by mass of resin A to 50 parts by mass of resin B was 1.00. Specifically, the value of MFR of the resin material according to the blend ratio was calculated by finding a sum of the MFR of resin A (0.3) subjected to a calculation process using the blend ratio (50%) (0.3×50/100=0.15) and the MFR of resin B (1.7) subjected to a calculation process using the blend ratio (50%) (1.7×50/100=0.85) (0.15+085=1.00).

Notes:
Molding Conditions:
 Outer diameter of parison: 120 mm
 Resin temperature at the exit of dies: 172° C.
 Thickness of parison: 5 mm
 Average thickness of instrument panel duct 1: 0.5 mm
 The MFR (190° C., g/10 min) of the molded instrument panel duct 1 was 0.40.
 The expansion ratio of the molded instrument panel duct 1 was 4.3.

The surface roughness Rmax of the duct inner surface of the molded instrument panel duct 1 was not more than 200 μm. Accordingly, the surface roughness was high ("Good").

When the molded instrument panel duct 1 was taken out of the split mold blocks 12a and 12b, the foamed resin constituting the instrument panel duct 1 did not become attached to the split mold blocks 12a and 12b. Namely, the instrument panel duct 1 was easily taken out of the split mold blocks 12a and 12b. Accordingly, the ease of removal was high ("Good").

The burrs on the molded instrument panel duct 1 were easily removed. Accordingly, the ease of deburring was high ("Good").

The value of MFR was measured at the test temperature of 190° C. and with the test load of 2.16 kg according to JIS K-7210.

The value of expansion ratio was determined by dividing the density of the foamed resin used for molding the instrument panel duct 1 by the apparent density of the tube body X1 of the molded instrument panel duct 1 (see FIG. 3).

The surface roughness Rmax indicates the maximum height measured using a surface roughness meter (SURF-COM 470A manufactured by Tokyo Seimitsu Co., Ltd.). The surface roughness was measured at all regions of the duct inner surface of the instrument panel duct 1. The surface roughness was evaluated by a method such that the surface roughness was considered to be high ("Good") when Rmax was not higher than 200 μm in all of the regions. When there was a portion with Rmax of higher than 200 μm, the surface roughness was considered low ("Poor").

The ease of removal was evaluated by a method such that the ease of removal was evaluated to high ("Good") if the foamed resin constituting the instrument panel duct 1 did not become attached to the split mold blocks 12a and 12b when, after blow molding, the instrument panel duct 1 was removed from between the split mold blocks 12a and 12b opened with the burrs formed on top of the instrument panel duct 1 being gripped by a predetermined machine (such as clips), and therefore the instrument panel duct 1 was easily taken out of the split mold blocks 12a and 12b. The ease of removal was evaluated to be low ("Poor") if, when the instrument panel duct 1 was removed from between the opened split mold blocks 12a and 12b, the foamed resin constituting the instrument panel duct 1 became attached to the split mold blocks 12a and 12b, so that the instrument panel duct 1 was moved by a predetermined distance or more together with the movement of the split mold blocks 12a and 12b. The ease of removal was also evaluated to be low ("Poor") if foamed resin remained on the split mold blocks 12a and 12b. The burrs formed on top of the instrument panel duct 1 refer to the portion of foamed resin protruding from the top of the split mold blocks 12a and 12b being clamped.

The ease of deburring was evaluated by a method such that, when the burrs formed around the instrument panel duct 1 taken out of the split mold blocks 12a and 12b were partially cut with a cutter or the like so as to remove the burrs by hand, for example, the ease of deburring was evaluated to be high ("Good") if the burrs were easily removed from the instrument panel duct 1. If the burrs became torn and remained on the instrument panel duct 1 during attempted removal, or if the instrument panel duct 1 was deformed during the removal of burrs, the ease of deburring was evaluated to be low ("Poor"). The burrs may be formed around the parting line of the instrument panel duct 1, with a thin portion formed between the instrument panel duct 1 and the burrs by pinch-off. The burrs are cut off at the thin portion.

Example 2

The instrument panel duct 1 was molded by the same method as according to example 1 with the exception that the foamed resin as raw material resin of the instrument panel duct 1 was prepared by melting and kneading 60 parts by mass of resin A and 40 parts by mass of resin B.

The MFR (190° C., g/10 min) of the resin material calculated according to the blend ratio of 60 parts by mass of resin A to 40 parts by mass of resin B was 0.86.

The MFR (190° C., g/10 min) of the molded instrument panel duct 1 was 0.37.

The expansion ratio of the molded instrument panel duct 1 was 3.9.

The surface roughness, ease of removal, and ease of deburring were all high ("Good").

Example 3

The instrument panel duct 1 was molded by the same method as according to example 1 with the exception that the foamed resin as raw material resin of the instrument panel duct 1 was prepared by melting and kneading 70 parts by mass of resin A and 30 parts by mass of resin B.

The MFR (190° C., g/10 min) of the resin material calculated according to the blend ratio of 70 parts by mass of resin A to 30 parts by mass of resin B was 0.72.

The MFR (190° C., g/10 min) of the molded instrument panel duct 1 was 0.26.

The expansion ratio of the molded instrument panel duct 1 was 2.8.

The surface roughness, ease of removal, and ease of deburring were all high ("Good").

Example 4

The instrument panel duct 1 was molded by the same method as according to example 1 with the exception that the foamed resin as raw material resin of the instrument panel duct 1 was prepared by melting and kneading 80 parts by mass of resin A and 20 parts by mass of resin B.

The MFR (190° C., g/10 min) of the resin material calculated according to the blend ratio of 80 parts by mass of resin A to 20 parts by mass of resin B was 0.58.

The MFR (190° C., g/10 min) of the molded instrument panel duct 1 was 0.22.

The expansion ratio of the molded instrument panel duct 1 was 2.2.

The surface roughness, ease of removal, and ease of deburring were all high ("Good").

Example 5

The instrument panel duct 1 was molded by the same method as according to example 1 with the exception that the foamed resin as raw material resin of the instrument panel duct 1 was prepared by melting and kneading 90 parts by mass of resin A and 10 parts by mass of resin B.

The MFR (190° C., g/10 min) of the resin material calculated according to the blend ratio of 90 parts by mass of resin A to 10 parts by mass of resin B was 0.44.

The MFR (190° C., g/10 min) of the molded instrument panel duct 1 was 0.18.

The expansion ratio of the molded instrument panel duct 1 was 1.6.

The surface roughness, ease of removal, and ease of deburring were all high ("Good").

Example 6

The instrument panel duct 1 was molded by the same method as according to example 1 with the exception that the foamed resin as raw material resin of the instrument panel duct 1 was prepared by melting and kneading 60 parts by mass of resin A and 40 parts by mass of resin C.

Resin C was a low-density polyethylene-based resin (CP763 manufactured by Schulman; density=0.919 g/cm$^3$, MFR=1.8 g/10 min at 190° C., polymerization process=tubular process).

The MFR (190° C., g/10 min) of the foamed resin obtained by melting and kneading resin A and resin C was 0.9.

The MFR (190° C., g/10 min) of the resin material calculated according to the blend ratio of 60 parts by mass of resin A to 40 parts by mass of resin C was 0.90.

The MFR (190° C., g/10 min) of the molded instrument panel duct 1 was 0.39.

The expansion ratio of the molded instrument panel duct 1 was 1.6.

The surface roughness, ease of removal, and ease of deburring were all high ("Good").

Example 7

The instrument panel duct 1 was molded by the same method as according to example 1 with the exception that the foamed resin as raw material resin of the instrument panel duct 1 was prepared by melting and kneading 60 parts by mass of resin A and 40 parts by mass of resin D.

Resin D was a low-density polyethylene-based resin (Sumikathene F108-1 manufactured by Sumitomo Chemical Company, Limited; density=0.921 g/cm$^3$, MFR=0.4 g/10 min at 190° C., polymerization process=tubular process).

The MFR (190° C., g/10 min) of the foamed resin obtained by melting and kneading resin A and resin D was 0.34.

The MFR (190° C., g/10 min) of the resin material calculated according to the blend ratio of 60 parts by mass of resin A to 40 parts by mass of resin D was 0.34.

The MFR (190° C., g/10 min) of the molded instrument panel duct 1 was 0.17.

The expansion ratio of the molded instrument panel duct 1 was 1.3.

The surface roughness, ease of removal, and ease of deburring were all high ("Good").

Example 8

The instrument panel duct 1 was molded by the same method as according to example 1 with the exception that the foamed resin as raw material resin of the instrument panel duct 1 was prepared by melting and kneading 100 parts by mass of resin D.

The MFR (190° C., g/10 min) of the resin material calculated according to the blend ratio of 100 parts by mass of resin D was 0.40.

The MFR (190° C., g/10 min) of the molded instrument panel duct 1 was 0.18.

The expansion ratio of the molded instrument panel duct 1 was 1.6.

The surface roughness, ease of removal, and ease of deburring were all high ("Good").

Comparative Example 1

The instrument panel duct 1 was molded by the same method as according to example 1 with the exception that the foamed resin as raw material resin of the instrument panel duct 1 was prepared by melting and kneading 100 parts by mass of resin B.

The MFR (190° C., g/10 min) of the resin material calculated according to the blend ratio of 100 parts by mass of resin B was 1.70.

The MFR (190° C., g/10 min) of the molded instrument panel duct 1 was 0.80.

The expansion ratio of the molded instrument panel duct 1 was 5.0.

The surface roughness Rmax of the duct inner surface of the molded instrument panel duct 1 was not more than 200 μm. Accordingly, the surface roughness was high ("Good").

When the molded instrument panel duct 1 was taken out of the split mold blocks 12a and 12b, the foamed resin constituting the instrument panel duct 1 became attached to the split mold blocks 12a and 12b, and therefore the instrument panel duct 1 was not easily taken out of the split mold blocks 12a and 12b. Accordingly, the ease of removal was low ("Poor").

The burrs on the molded instrument panel duct 1 were not easily removed. Accordingly, the ease of deburring was low ("Poor").

Comparative Example 2

The instrument panel duct 1 was molded by the same method as according to example 1 with the exception that the foamed resin as raw material resin of the instrument panel duct 1 was prepared by melting and kneading 60 parts by mass of resin E and 40 parts by mass of resin B.

Resin E was a high-density polyethylene-based resin (J240 manufactured by Asahi Kasei Chemicals Corp.; density=0.966 g/cm$^3$, MFR=5.0 g/10 min at 190° C., polymerization process=tubular process).

The MFR (190° C., g/10 min) of the resin material calculated according to the blend ratio of 60 parts by mass of resin E to 40 parts by mass of resin B was 3.68.

The MFR (190° C., g/10 min) of the molded instrument panel duct 1 was 3.20.

The expansion ratio of the molded instrument panel duct 1 was 4.3.

The surface roughness Rmax of the duct inner surface of the molded instrument panel duct 1 was partly higher than 200 μm. Accordingly, the surface roughness was low ("Poor").

When the molded instrument panel duct 1 was taken out of the split mold blocks 12a and 12b, the foamed resin constituting the instrument panel duct 1 became attached to the split mold blocks 12a and 12b, and therefore the instrument panel duct 1 was not easily taken out of the split mold blocks 12a and 12b. Accordingly, the ease of removal was low ("Poor").

The burrs on the molded instrument panel duct 1 were not easily removed. Accordingly, the ease of deburring was low ("Poor").

FIG. 9 shows the test results for examples 1 to 8 and comparative examples 1 and 2. Specifically, FIG. 9 shows the blend ratios of the resin material used when molding the instrument panel duct 1 according to examples 1 to 8 and comparative examples 1 and 2; the MFRs of the resin material calculated according to the blend ratios; the MFRs of the molded instrument panel duct 1; and the expansion ratios, surface roughness, ease of removal, and ease of deburring of the molded instrument panel duct 1.

As shown in FIG. 9, it was learned that the instrument panel duct 1 having high surface roughness, ease of removal, and ease of deburring was obtained when the MFR of the molded instrument panel duct 1 was set to be less than 0.8, or when the MFR of the resin material calculated according to the blend ratio was set to be not more than 1.0.

It was also learned that the instrument panel duct 1 having high expansion ratios can be obtained by using foamed resin obtained by mixing high-density polyethylene-based resin and low-density polyethylene-based resin.

Further, it was learned that the instrument panel duct 1 having high expansion ratios can be obtained by using foamed resin obtained by mixing polyethylene-based resin manufactured by autoclave process.

It was additionally learned that the instrument panel duct 1 having high surface roughness, ease of removal, and ease of deburring can be obtained by using low-density polyethylene-based resin with the MFR of 1.0 to 3.0, and by setting the MFR of the molded instrument panel duct 1 to be less than 0.8 or by setting the MFR of the resin material calculated according to the blend ratio to be not more than 1.0.

The foregoing example is a preferable example of the present invention, and the present invention is not limited to such example. Various modifications of the present invention may be implemented based on the technical concept of the present invention.

While the example has been described with reference to the instrument panel duct 1, the present invention may also be applied to, e.g., a rear air-conditioner duct and the like.

The invention claimed is:

1. A blow molded foam molded from a foamed resin made of a polyethylene-based resin, the blow molded foam being an automobile duct configured to circulate cool or warm aft supplied from an air conditioning unit, wherein the blow molded foam has a MFR (190° C., g/10 min) of not less than 0.17 and not more than 0.40, and wherein a surface roughness Rmax of the blow molded foam is 200 μm or less, wherein the polyethylene-based resin has a MFR (190° C., g/10 min) of not less than 0.34 and not more than 1.0, wherein the polyethylene-based resin consists of:
   a high-density polyethylene-based resin of between 50 parts by mass and 90 parts by mass, wherein the high-density polyethylene-based resin has a density 0.949 g/cm$^3$, a MFR of 0.3 g/10 min, and
   a low-density polyethylene-based resin of between 10 parts by mass and 50 parts by mass, wherein the low-density polyethylene-based resin has a density 0.919 g/cm$^3$, a a MFR of 1.7 g/10 min.

2. The blow molded foam molded according to claim 1, wherein the low-density polyethylene-based resin is manufactured by an autoclave process.

3. The blow molded foam according to claim 1, wherein the polyethylene-based resin consists of the high-density polyethylene-based resin of 50 parts by mass and the low-density polyethylene-based resin of 50 parts by mass.

4. The blow molded foam according to claim 1, comprising
   a tube body having a supply portion to be connected to an air conditioner unit; and tube portions with one end connected to the supply portion and other end provided with fitting portions, and
   flange portions connected to the tube body, wherein
   the automobile duct is configured to circulate cool or warm air supplied from the supply portion into the tube body.

5. The blow molded foam molded according to claim 1, wherein the polyethylene-based resin has a MFR (190° C., g/10 min) of 0.34 to 0.9.

6. The blow molded foam molded according to claim 1, wherein the polyethylene-based resin has a MFR (190° C., g/10 min) of not less than 0.44 and not more than 1.0.

* * * * *